A. B. PEDERSEN.
AIR COMPRESSOR.
APPLICATION FILED JUNE 7, 1919.

1,333,774.

Patented Mar. 16, 1920.
2 SHEETS—SHEET 1.

WITNESSES

INVENTOR
Albert B. Pederson.

BY

ATTORNEYS

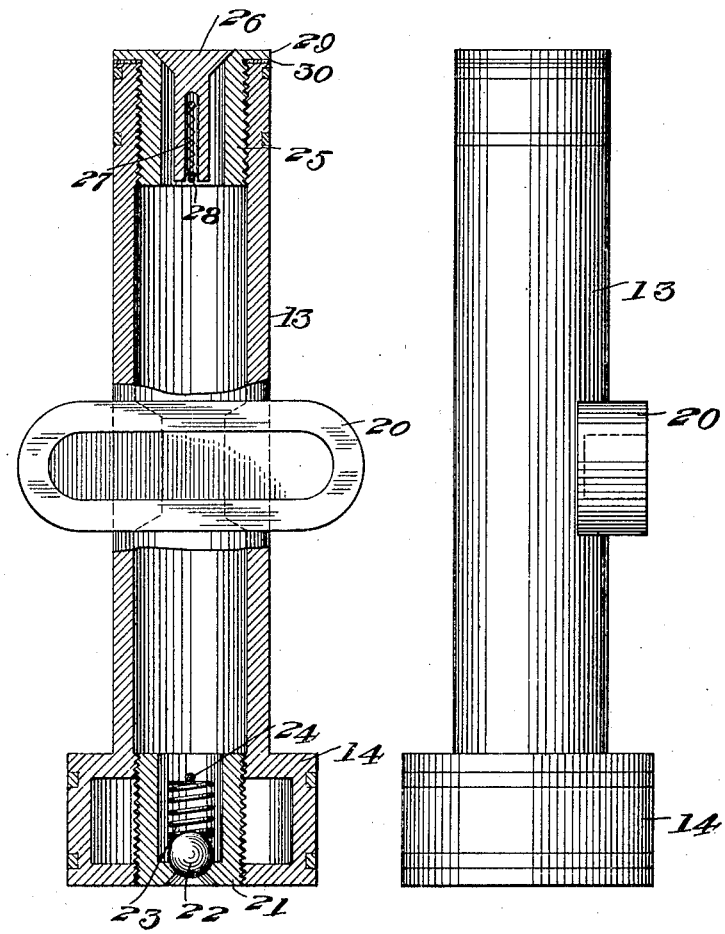

UNITED STATES PATENT OFFICE.

ALBERT B. PEDERSEN, OF EUREKA, UTAH.

AIR-COMPRESSOR.

1,333,774.     Specification of Letters Patent.     Patented Mar. 16, 1920.

Application filed June 7, 1919. Serial No. 302,376.

*To all whom it may concern:*

Be it known that I, ALBERT B. PEDERSEN, a citizen of the United States, and a resident of Eureka, in the county of Juab and State of Utah, have invented certain new and useful Improvements in Air-Compressors, of which the following is a specification.

My invention is an improvement in air compressors, and has for its object to provide a device of the character specified especially adapted for inflating the tires of motor vehicles, wherein the compressor has a high and a low pressure side, the air compressed by the low pressure side passing freely through the high pressure side so that the high pressure side does not begin to compress until the pressure in the tire attains a predetermined point.

In the drawings:

Fig. 2 is a front view of the piston, with parts in section;

Fig. 3 is a side view.

Figure 1:
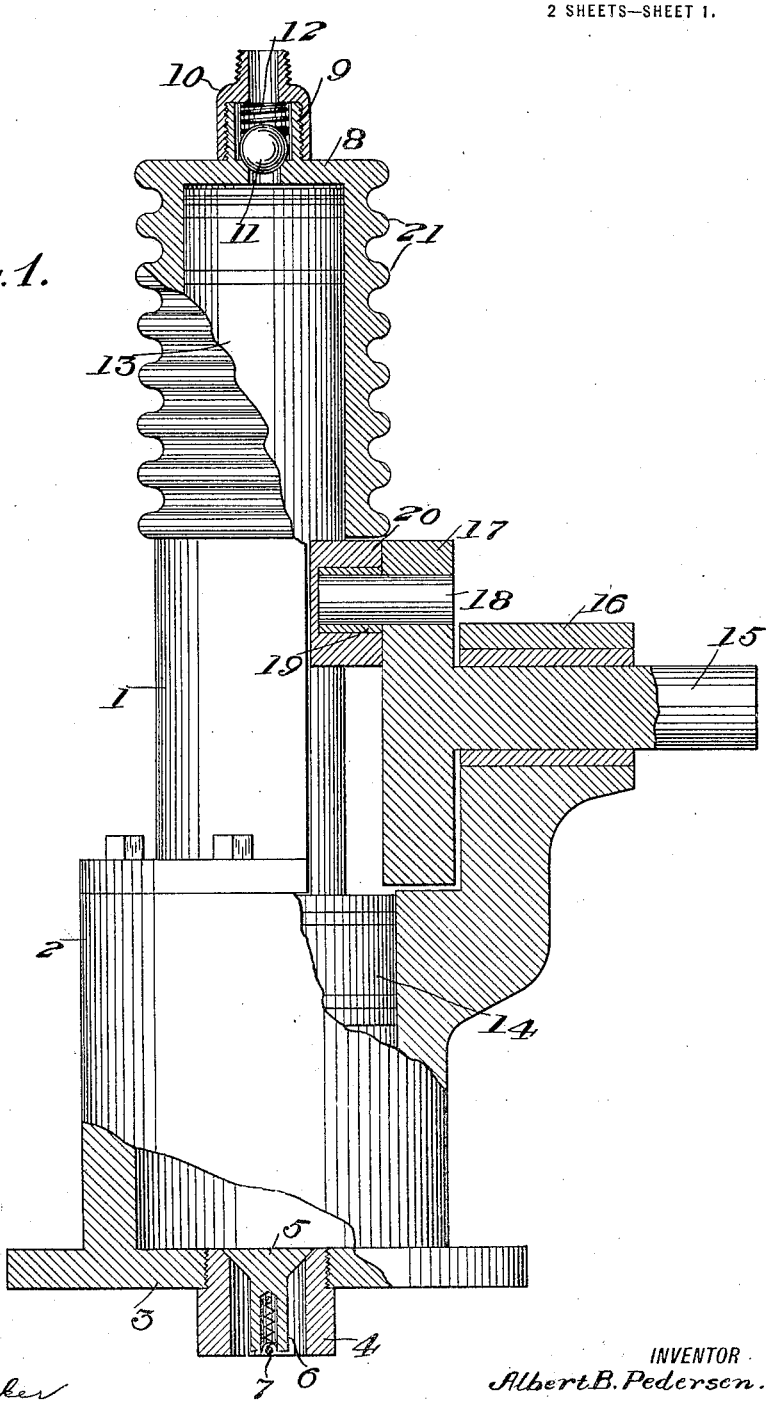
Figure 1 is a front view of a pump constructed in accordance with the invention, with parts broken away.

In the embodiment of the invention shown the cylinder of the pump consists of two portions 1 and 2 of unequal diameter, the portion 2 having a suitable head 3 at the end remote from the portion 1 which acts as a base and is provided with a central port into which is threaded a nipple 4. This nipple has its inner end beveled to form a valve seat, and a conical valve 5 coöperates with the seat, the valve being normally held to its seat by a coil spring 6 which is arranged within a recess in the stem of the valve between the valve and a pin 7 extending transversely of the nipple.

The portion 1 has its upper end closed by a head 8 provided with a central port, which is encircled by a nipple 9. A reducing union 10 is threaded on to the nipple and a check valve 11 coöperates with the port, the valve being normally held to its seat by a coil spring 12.

A piston 13 is arranged to reciprocate in the portion 1 and this piston is rigid with a piston 14 fitting within the portion 2 and reciprocating therein. The combined pistons are reciprocated by means of a shaft 15 which is journaled in a bearing arm 16 on the portion 2, and the bearing arm has a disk 17 which is provided with an eccentric crank 18. The crank pin 18 has a roller or bushing 19 which moves in a transversely arranged guideway 20 rigid with the combined piston, the arrangement being such that when the shaft 15 is rotated the pistons will be simultaneously reciprocated, one drawing air into its cylinder while the other forces the air out. It will be noticed that the upper end of the portion 1 of the cylinder has annular ribs or fins 21 for assisting in cooling, and both pistons have the usual piston rings.

Referring to Fig. 2 it will be seen that the double piston is hollow, and that each end has a valve. In the piston 4 there is threaded a valve seat 21, and a ball valve 22 coöperates with the seat, a spring 23 normally holding the valve closed, the said spring being arranged between the valve and the cross pin 24 in the seat.

A valve seat 25 is threaded into the upper end of the double piston, that is, into the portion 13, and with this seat coöperates a conical valve 26. The stem of the valve is hollow and a coil spring 27 is arranged therein, between the valve and a cross pin 28 in the seat. It will be noticed that the seat has a marginal flange 29 at its upper end, which fits upon the end of the piston and a gasket 30 is arranged between the flange and the piston.

In operation, when the double piston moves upwardly, air is drawn past the valve 5, while at the same time the air above the piston 13 is driven out past the valve 11. When the double piston moves downward, the air below the piston 14 is compressed, since it cannot pass out by way of the valve 5, and lifts the valve 22, passing into the hollow piston.

A continuation of this movement will eventually compress the air in the piston and the valve 26 will be lifted so that the compressed air can pass out into the portion 1 of the cylinder. From here it may pass by way of the valve 11 to the tire to be inflated. After the pressure in the tire equals that in the portion 2 of the pump, the portion 1 of the pump will come into operation to compress the air to a higher degree and to complete the inflation of the pump. So long as this pressure in the tire is not equal to that in the cylinder 2, there will be no compression in the cylinder 1.

I claim:

An air compressor comprising axially alined cylinders of different diameters constituting high and low pressure cylinders, a single piston disposed within said cylinders and having one end of a diameter to fit within the smaller cylinder and having its other end enlarged to fit within the larger cylinder, said piston being formed hollow and having the ends of its bore closed by members provided with valve seats, an inwardly opening check valve closing the seat at the enlarged end of the piston, an outwardly opening check valve closing the seat at the smaller end of the piston, and means for reciprocating the piston.

ALBERT B. PEDERSEN.